US010241960B2

(12) United States Patent
Kent, IV et al.

(10) Patent No.: US 10,241,960 B2
(45) Date of Patent: Mar. 26, 2019

(54) HISTORICAL DATA REPLAY UTILIZING A COMPUTER SYSTEM

(71) Applicant: Deephaven Data Labs LLC, Plymouth, MN (US)

(72) Inventors: David R. Kent, IV, Colorado Springs, CO (US); Ryan Caudy, New York, NY (US); Charles Wright, Cortlandt Manor, NY (US); Oleg Vydrov, Oakland, CA (US); Radu Teodorescu, New York, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 0 days.

(21) Appl. No.: 15/155,010

(22) Filed: May 14, 2016

(65) Prior Publication Data

US 2016/0335361 A1 Nov. 17, 2016

Related U.S. Application Data

(60) Provisional application No. 62/161,813, filed on May 14, 2015.

(51) Int. Cl.
*G06F 17/30* (2006.01)
*H04L 29/08* (2006.01)
(Continued)

(52) U.S. Cl.
CPC ........ *G06F 16/2358* (2019.01); *G06F 3/0481* (2013.01); *G06F 3/0482* (2013.01);
(Continued)

(58) Field of Classification Search
CPC ......... G06F 17/30477; G06F 17/30528; G06F 17/30867; G06F 16/2358; G06F 16/24575; G06F 16/24553; G06F 16/23; G06F 16/22; G06F 16/221; G06F 16/2457; G06F 16/2456; G06F 16/2455; G06F 16/2428; G06F 16/2379; G06F 16/2372; G06F 16/2365; G06F 16/2282; G06F 16/2272; G06F 16/2264; G06F 16/2246; G06F 16/2237; G06F 16/2228; G06F 16/951;
(Continued)

(56) References Cited

U.S. PATENT DOCUMENTS 5,335,202 A 8/1994 Manning et al.
5,452,434 A 9/1995 Macdonald
(Continued)

FOREIGN PATENT DOCUMENTS

CA 2309462 A1 12/2000
EP 1406463 A2 4/2004
(Continued)

OTHER PUBLICATIONS

"IBM Informix TimeSeries data management", dated Jan. 18, 2016. Retrieved from https://web.archive.org/web/20160118072141/http://www-01.ibm.com/software/data/informix/timeseries/.
(Continued)

*Primary Examiner* — James E Richardson
(74) *Attorney, Agent, or Firm* — Carmichael IP, PLLC

(57) ABSTRACT

Described are methods, systems and computer readable media for simulated replay of data using a computer system.

29 Claims, 9 Drawing Sheets

(51) Int. Cl.
| | |
|---|---|
| *G06F 16/2455* | (2019.01) |
| *G06F 16/23* | (2019.01) |
| *G06F 16/22* | (2019.01) |
| *G06F 16/27* | (2019.01) |
| *G06F 16/16* | (2019.01) |
| *G06F 16/215* | (2019.01) |
| *G06F 16/245* | (2019.01) |
| *G06F 16/248* | (2019.01) |
| *G06F 16/25* | (2019.01) |
| *G06F 16/28* | (2019.01) |
| *G06F 16/907* | (2019.01) |
| *G06F 16/951* | (2019.01) |
| *G06F 16/242* | (2019.01) |
| *G06F 16/2457* | (2019.01) |
| *G06F 16/901* | (2019.01) |
| *G06F 16/9535* | (2019.01) |
| *G06F 16/955* | (2019.01) |
| *G06F 16/957* | (2019.01) |
| *G06F 16/2453* | (2019.01) |
| *G06F 3/0482* | (2013.01) |
| *G06F 3/0489* | (2013.01) |
| *G06F 17/22* | (2006.01) |
| *G06F 17/24* | (2006.01) |
| *G06F 17/27* | (2006.01) |
| *G06F 12/084* | (2016.01) |
| *H04L 12/58* | (2006.01) |
| *G06F 15/173* | (2006.01) |
| *G06F 3/0481* | (2013.01) |
| *G06F 3/0484* | (2013.01) |
| *G06F 3/0485* | (2013.01) |
| *G06F 12/02* | (2006.01) |
| *G06F 8/30* | (2018.01) |
| *G06F 8/41* | (2018.01) |
| *G06F 3/06* | (2006.01) |
| *G06F 11/14* | (2006.01) |
| *H04L 29/06* | (2006.01) |
| *G06F 8/60* | (2018.01) |
| *H04L 12/18* | (2006.01) |
| *H04L 29/12* | (2006.01) |
| *G06F 12/14* | (2006.01) |
| *G06F 21/00* | (2013.01) |
| *G06F 21/62* | (2013.01) |
| *G06F 3/0483* | (2013.01) |
| *G06F 17/40* | (2006.01) |

(52) U.S. Cl.
CPC .......... *G06F 3/0483* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01); *G06F 16/162* (2019.01); *G06F 16/215* (2019.01); *G06F 16/22* (2019.01); *G06F 16/221* (2019.01); *G06F 16/2228* (2019.01); *G06F 16/2237* (2019.01); *G06F 16/2246* (2019.01); *G06F 16/2264* (2019.01); *G06F 16/2272* (2019.01); *G06F 16/2282* (2019.01); *G06F 16/23* (2019.01); *G06F 16/2365* (2019.01); *G06F 16/2372* (2019.01); *G06F 16/2379* (2019.01); *G06F 16/245* (2019.01); *G06F 16/248* (2019.01); *G06F 16/2428* (2019.01); *G06F 16/2455* (2019.01); *G06F 16/2456* (2019.01); *G06F 16/2457* (2019.01); *G06F 16/24534* (2019.01); *G06F 16/24535* (2019.01); *G06F 16/24537* (2019.01); *G06F 16/24539* (2019.01); *G06F 16/24553* (2019.01); *G06F 16/24575* (2019.01); *G06F 16/254* (2019.01); *G06F 16/27* (2019.01); *G06F 16/278* (2019.01); *G06F 16/285* (2019.01); *G06F 16/907* (2019.01); *G06F 16/9024* (2019.01); *G06F 16/951* (2019.01); *G06F 16/9535* (2019.01); *G06F 16/9566* (2019.01); *G06F 16/9574* (2019.01); *G06F 17/2235* (2013.01); *G06F 17/24* (2013.01); *G06F 17/245* (2013.01); *G06F 17/246* (2013.01); *G06F 17/276* (2013.01); *G06F 17/2715* (2013.01); *G06F 17/30117* (2013.01); *G06F 17/30283* (2013.01); *G06F 17/30303* (2013.01); *G06F 17/30312* (2013.01); *G06F 17/30315* (2013.01); *G06F 17/30321* (2013.01); *G06F 17/30324* (2013.01); *G06F 17/30327* (2013.01); *G06F 17/30333* (2013.01); *G06F 17/30336* (2013.01); *G06F 17/30339* (2013.01); *G06F 17/30345* (2013.01); *G06F 17/30368* (2013.01); *G06F 17/30371* (2013.01); *G06F 17/30374* (2013.01); *G06F 17/30377* (2013.01); *G06F 17/30398* (2013.01); *G06F 17/30424* (2013.01); *G06F 17/30448* (2013.01); *G06F 17/30451* (2013.01); *G06F 17/30454* (2013.01); *G06F 17/30457* (2013.01); *G06F 17/30477* (2013.01); *G06F 17/30483* (2013.01); *G06F 17/30498* (2013.01); *G06F 17/30522* (2013.01); *G06F 17/30528* (2013.01); *G06F 17/30554* (2013.01); *G06F 17/30563* (2013.01); *G06F 17/30584* (2013.01); *G06F 17/30598* (2013.01); *G06F 17/30864* (2013.01); *G06F 17/30867* (2013.01); *G06F 17/30887* (2013.01); *G06F 17/30902* (2013.01); *G06F 17/30958* (2013.01); *G06F 17/30997* (2013.01); *G06F 21/00* (2013.01); *G06F 21/6209* (2013.01); *H04L 12/18* (2013.01); *H04L 51/046* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/141* (2013.01); *H04L 67/28* (2013.01); *H04L 67/2833* (2013.01); *H04L 67/2842* (2013.01); *H04L 67/34* (2013.01); *H04L 67/42* (2013.01); *H04L 69/16* (2013.01); *G06F 16/2291* (2019.01); *G06F 17/30342* (2013.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *H04L 67/2847* (2013.01)

(58) Field of Classification Search
CPC .... G06F 16/907; G06F 16/285; G06F 16/278; G06F 16/254; G06F 16/248; G06F 16/245; G06F 16/27; G06F 16/162; G06F 16/24539; G06F 16/24537; G06F 16/24535; G06F 16/24534; G06F 16/9574; G06F 16/9566; G06F 16/9535; G06F 16/9024; G06F 16/215; G06F 3/0483; G06F 8/60; G06F 11/1464; G06F 17/30324; G06F 3/0656; G06F 3/067; G06F 12/0261; G06F 11/1469; G06F 17/30333; G06F 3/0605; G06F 8/427; G06F 8/41; G06F 8/30; G06F 17/2715; G06F 17/246; G06F 15/17331; G06F 17/276; G06F 17/24; G06F 17/2235; G06F 12/084; G06F 3/0482; G06F 17/30424; G06F 3/04895; G06F 17/30454; G06F 17/30584; G06F 17/30345; G06F 11/1451; G06F 17/30371; G06F 17/30997; G06F 17/30522; G06F 17/30327; G06F 17/30398; G06F 17/30887; G06F 17/30315; G06F 17/30864; G06F 17/30563; G06F 17/30377; G06F 17/30312; G06F 17/30448; G06F 17/30117; G06F 3/0485; G06F 3/04847; G06F 3/0481; G06F 17/30554; G06F 17/30321; G06F 17/30958; G06F 17/30368; G06F 17/30374; G06F 17/30339; G06F 17/30336; G06F 16/2291; G06F 2212/163; G06F 17/30342; G06F 2212/154; G06F 17/40; G06F 2212/1052; G06F 2212/60; G06F 2201/84; G06F 2201/805; G06F 17/30483; G06F 21/6209; G06F 17/245; G06F 12/1483; G06F 21/00; G06F 17/30457; G06F 17/30451; G06F 17/30498; G06F 17/30303; G06F 17/30283; G06F 17/30902; G06F 17/30598; G06Q 40/40; G06Q 40/04; G06Q 40/06; H04L 63/102; H04L 63/101; H04L 12/18; H04L 67/1002; H04L 51/12; H04L 67/42; H04L 69/16; H04L 61/2069; H04L 67/34; H04L 67/141; H04L 67/2847; H04L 51/046; H04L 67/28; H04L 67/2833; H04L 67/2842

See application file for complete search history.

(56) References Cited

U.S. PATENT DOCUMENTS

| | | | |
|---|---|---|---|
| 5,469,567 A | 11/1995 | Okada | |
| 5,504,885 A | 4/1996 | Alashqur | |
| 5,530,939 A | 6/1996 | Mansfield et al. | |
| 5,568,632 A | 10/1996 | Nelson | |
| 5,673,369 A | 9/1997 | Kim | |
| 5,701,461 A | 12/1997 | Dalal et al. | |
| 5,701,467 A | 12/1997 | Freeston | |
| 5,764,953 A * | 6/1998 | Collins | G06Q 10/06 703/17 |
| 5,787,428 A | 7/1998 | Hart | |
| 5,806,059 A | 9/1998 | Tsuchida et al. | |
| 5,859,972 A | 1/1999 | Subramaniam et al. | |
| 5,875,334 A | 2/1999 | Chow et al. | |
| 5,878,415 A | 3/1999 | Olds | |
| 5,890,167 A | 3/1999 | Bridge et al. | |
| 5,899,990 A | 5/1999 | Maritzen et al. | |
| 5,920,860 A | 7/1999 | Maheshwari et al. | |
| 5,943,672 A | 8/1999 | Yoshida | |
| 5,960,087 A | 9/1999 | Tribble et al. | |
| 5,991,810 A | 11/1999 | Shapiro et al. | |
| 5,999,918 A * | 12/1999 | Williams | G06Q 40/00 702/179 |
| 6,006,220 A | 12/1999 | Haderle et al. | |
| 6,032,144 A | 2/2000 | Srivastava et al. | |
| 6,032,148 A | 2/2000 | Wilkes | |
| 6,038,563 A | 3/2000 | Bapat et al. | |
| 6,058,394 A | 5/2000 | Bakow et al. | |
| 6,061,684 A | 5/2000 | Glasser et al. | |
| 6,138,112 A | 10/2000 | Slutz | |
| 6,160,548 A | 12/2000 | Lea et al. | |
| 6,266,669 B1 | 7/2001 | Brodersen et al. | |
| 6,289,357 B1 | 9/2001 | Parker | |
| 6,292,803 B1 | 9/2001 | Richardson et al. | |
| 6,304,876 B1 | 10/2001 | Isip | |
| 6,317,728 B1 | 11/2001 | Kane | |
| 6,327,702 B1 | 12/2001 | Sauntry et al. | |
| 6,336,114 B1 | 1/2002 | Garrison | |
| 6,353,819 B1 | 3/2002 | Edwards et al. | |
| 6,367,068 B1 | 4/2002 | Vaidyanathan et al. | |
| 6,389,414 B1 | 5/2002 | Delo et al. | |
| 6,389,462 B1 | 5/2002 | Cohen et al. | |
| 6,438,537 B1 | 8/2002 | Netz et al. | |
| 6,446,069 B1 | 9/2002 | Yaung et al. | |
| 6,460,037 B1 | 10/2002 | Weiss et al. | |
| 6,473,750 B1 | 10/2002 | Petculescu et al. | |
| 6,487,552 B1 | 11/2002 | Lei et al. | |
| 6,496,833 B1 | 12/2002 | Goldberg et al. | |
| 6,505,189 B1 | 1/2003 | Au et al. | |
| 6,505,241 B2 | 1/2003 | Pitts | |
| 6,510,551 B1 | 1/2003 | Miller | |
| 6,530,075 B1 | 3/2003 | Beadle et al. | |
| 6,538,651 B1 | 3/2003 | Hayman et al. | |
| 6,546,402 B1 | 4/2003 | Beyer et al. | |
| 6,553,375 B1 | 4/2003 | Huang et al. | |
| 6,584,474 B1 | 6/2003 | Pereira | |
| 6,604,104 B1 | 8/2003 | Smith | |
| 6,618,720 B1 | 9/2003 | Au et al. | |
| 6,631,374 B1 | 10/2003 | Klein et al. | |
| 6,640,234 B1 | 10/2003 | Coffen et al. | |
| 6,697,880 B1 | 2/2004 | Dougherty | |
| 6,701,415 B1 | 3/2004 | Hendren | |
| 6,714,962 B1 | 3/2004 | Helland et al. | |
| 6,725,243 B2 | 4/2004 | Snapp | |
| 6,732,100 B1 | 5/2004 | Brodersen et al. | |
| 6,745,332 B1 | 6/2004 | Wong et al. | |
| 6,748,374 B1 | 6/2004 | Madan et al. | |
| 6,748,455 B1 | 6/2004 | Hinson et al. | |
| 6,760,719 B1 | 7/2004 | Hanson et al. | |
| 6,775,660 B2 | 8/2004 | Lin et al. | |
| 6,785,668 B1 | 8/2004 | Polo et al. | |
| 6,795,851 B1 | 9/2004 | Noy | |
| 6,816,855 B2 | 11/2004 | Hartel et al. | |
| 6,820,082 B1 | 11/2004 | Cook et al. | |
| 6,829,620 B2 | 12/2004 | Michael et al. | |
| 6,832,229 B2 | 12/2004 | Reed | |
| 6,851,088 B1 | 2/2005 | Conner et al. | |
| 6,882,994 B2 | 4/2005 | Yoshimura et al. | |
| 6,925,472 B2 | 8/2005 | Kong | |
| 6,934,717 B1 | 8/2005 | James | |
| 6,947,928 B2 | 9/2005 | Dettinger et al. | |
| 6,983,291 B1 | 1/2006 | Cochrane et al. | |
| 6,985,895 B2 | 1/2006 | Witkowski et al. | |
| 6,985,899 B2 | 1/2006 | Chan et al. | |
| 6,985,904 B1 | 1/2006 | Kaluskar et al. | |
| 7,020,649 B2 | 3/2006 | Cochrane et al. | |
| 7,024,414 B2 | 4/2006 | Sah et al. | |
| 7,031,962 B2 | 4/2006 | Moses | |
| 7,058,657 B1 | 6/2006 | Berno | |
| 7,089,228 B2 | 8/2006 | Arnold et al. | |
| 7,089,245 B1 | 8/2006 | George et al. | |
| 7,096,216 B2 | 8/2006 | Anonsen | |
| 7,099,927 B2 | 8/2006 | Cudd et al. | |
| 7,103,608 B1 | 9/2006 | Ozbutun et al. | |
| 7,110,997 B1 | 9/2006 | Turkel et al. | |
| 7,127,462 B2 | 10/2006 | Hiraga et al. | |
| 7,146,357 B2 | 12/2006 | Suzuki et al. | |
| 7,149,742 B1 | 12/2006 | Eastham et al. | |
| 7,167,870 B2 | 1/2007 | Avvari et al. | |
| 7,171,469 B2 | 1/2007 | Ackaouy et al. | |
| 7,174,341 B2 | 2/2007 | Ghukasyan et al. | |
| 7,181,686 B1 | 2/2007 | Bahrs | |
| 7,188,105 B2 | 3/2007 | Dettinger et al. | |
| 7,200,620 B2 | 4/2007 | Gupta | |
| 7,216,115 B1 | 5/2007 | Walters et al. | |

(56) References Cited

U.S. PATENT DOCUMENTS

| | | |
|---|---|---|
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 * | 2/2008 | Choi .................. G06Q 10/02 705/37 |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,747,640 B2 | 6/2010 | Dettinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent, IV et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,886,469 B2 | 2/2018 | Kent, IV et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent, IV et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 2002/0002576 A1 | 1/2002 | Wollrath et al. |
| 2002/0054587 A1 | 5/2002 | Baker et al. |
| 2002/0065981 A1 | 5/2002 | Jenne et al. |

(56) References Cited

U.S. PATENT DOCUMENTS

| | | |
|---|---|---|
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0116287 A1 | 5/2007 | Rasizade et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1* | 12/2009 | Rovaglio ............... G05B 17/02 700/17 |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1* | 7/2011 | Yang ..................... G06Q 40/06 705/36 R |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1* | 10/2012 | Crist ..................... G06Q 40/04 705/37 |
| 2012/0296846 A1* | 11/2012 | Teeter ................... G06Q 40/06 705/36 R |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1* | 11/2013 | Kayanuma ............ G06Q 40/04 705/37 |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0046638 A1* | 2/2014 | Peloski ................. G06F 17/5009 703/6 |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |

(56) References Cited

U.S. PATENT DOCUMENTS

| | | |
|---|---|---|
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Waite |
| 2014/0282227 A1* | 9/2014 | Nixon .............. G06F 17/5009 715/786 |
| 2014/0282444 A1 | 9/2014 | Araya et al. |
| 2014/0282540 A1 | 9/2014 | Bonnet et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2015/0356157 A1 | 12/2015 | Anderson et al. |
| 2016/0026442 A1 | 1/2016 | Chhaparia |
| 2016/0065670 A1 | 3/2016 | Kimmel et al. |
| 2016/0092599 A1 | 3/2016 | Barsness et al. |
| 2016/0125018 A1 | 5/2016 | Tomoda et al. |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0161514 A1 | 6/2017 | Dellinger et al. |
| 2017/0177677 A1 | 6/2017 | Wright et al. |
| 2017/0185385 A1 | 6/2017 | Kent, IV et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0359415 A1 | 12/2017 | Venkatraman et al. |
| 2018/0004796 A1 | 1/2018 | Kent, IV et al. |
| 2018/0011891 A1 | 1/2018 | Wright et al. |
| 2018/0052879 A1 | 2/2018 | Wright |
| 2018/0137175 A1 | 5/2018 | Teodorescu et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | WO-2014026220 A1 | 2/2014 |
| WO | 2014143208 A1 | 9/2014 |
| WO | WO-2016183563 A1 * | 11/2016 ....... G06F 17/30368 |

OTHER PUBLICATIONS

"IBM—What is HBase?", dated Sep. 6, 2015. Retrieved from https://web.archive.org/web/20150906022050/http://www-01.ibm.com/software/data/infosphere/hadoop/hbase/.

"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.

"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.

"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.

"Sophia Database—Architecture", dated Jan. 18, 2016. Retrieved from https://web.archive.org/web/20160118052919/http://sphia.org/architecture.html.

"Google Protocol RPC Library Overview", dated Apr. 27, 2016. Retrieved from https://cloud.google.com/appengine/docs/python/tools/protorpc/ (last accessed Jun. 16, 2016).

"Maximize Data Value with Very Large Database Management by SAP® Sybase® IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.

"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.

"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Oracle® Big Data Appliance—Software User's Guide", dated Feb. 2015. Retrieved from https://docs.oracle.com/cd/E55905_01/doc.40/e55814.pdf.

"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).

"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).

Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).

(56) References Cited

OTHER PUBLICATIONS

Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
Borror, Jefferey A. "Q for Mortals 2.0", dated Nov. 1, 2011. Retreived from http://code.kx.com/wiki/JB:QforMortals2/contents.
Gai, Lei et al. "An Efficient Summary Graph Driven Method for RDF Query Processing", dated Oct. 27, 2015. Retreived from http://arxiv.org/pdf/1510.07749.pdf.
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
Ex Parte Quayle Action mailed Aug. 8, 2016, in U.S. Appl. No. 15/154,999.
Final Office Action dated Dec. 19, 2016, in U.S. Appl. No. 15/154,995.
Final Office Action dated Jan. 27, 2017, in U.S. Appl. No. 15/154,980.
Final Office Action dated Jan. 31, 2017, in U.S. Appl. No. 15/154,996.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Mallet, "Relational Database Support for Spatia-Temporal Data", Technical Report TR 04-21, Sep. 2004, Jniversity of Alberta, Department of Computing Science.
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Aug. 12, 2016, in U.S. Appl. No. 15/155,001.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,981.

(56) References Cited

OTHER PUBLICATIONS

Non-final Office Action dated Aug. 8, 2016, in U.S. Appl. No. 15/154,985.
Non-final Office Action dated Nov. 17, 2016, in U.S. Appl. No. 15/154,999.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Jan. 30, 2017, in U.S. Appl. No. 15/154,987.
Notice of Allowance dated Nov. 17, 2016, in U.S. Appl. No. 15/154,991.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Advisory Action daed Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Dec. 21, 2017, in U.S. Appl. No. 15/154,984.
Advisory Action dated Mar. 31, 2017, in U.S. Appl. No. 15/154,996.
Advisory Action dated May 3, 2017, in U.S. Appl. No. 15/154,993.
Breitbart, Update Propagation Protocols for Replicated Databases, SIGMOD '99 Philadelphia PA, 1999, pp. 97-108.
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request mailed Nov. 20, 2017, in U.S. Appl. No. 15/154,997.
Final Office Action dated Apr. 10, 2017, in U.S. Appl. No. 15/155,006.
Final Office Action dated Dec. 29, 2017, in U.S. Appl. No. 15/154,974.
Final Office Action dated Feb. 24, 2017, in U.S. Appl. No. 15/154,993.
Final Office Action dated Jul. 27, 2017, in U.S. Appl. No. 15/154,993.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 4, 2017, in U.S. Appl. No. 15/155,009.
Kramer, The Combining DAG: A Technique for Parallel Data Flow Analysis, IEEE Transactions on Parallel and Distributed Systems, vol. 5, No. 8, Aug. 1994, pp. 805-813.
Non-final Office Action dated Apr. 19, 2017, in U.S. Appl. No. 15/154,974.
Non-final Office Action dated Aug. 14, 2017, in U.S. Appl. No. 15/464,314.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Feb. 8, 2017, in U.S. Appl. No. 15/154,997.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Mar. 2, 2017, in U.S. Appl. No. 15/154,984.
Non-final Office Action dated Mar. 20, 2018, in U.S. Appl. No. 15/155,006.
Non-final Office Action dated Nov. 15, 2017, in U.S. Appl. No. 15/654,461.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 5, 2017, in U.S. Appl. No. 15/428,145.
Notice of Allowance dated Feb. 12, 2018, in U.S. Appl. No. 15/813,142.
Notice of Allowance dated Feb. 14, 2017, in U.S. Appl. No. 15/154,979.
Notice of Allowance dated Feb. 26, 2018, in U.S. Appl. No. 15/428,145.
Notice of Allowance dated Feb. 28, 2017, in U.S. Appl. No. 15/154,990.
Notice of Allowance dated Jul. 28, 2017, in U.S. Appl. No. 15/155,009.
Notice of Allowance dated Jun. 19, 2017, in U.S. Appl. No. 15/154,980.

(56) References Cited

OTHER PUBLICATIONS

Notice of Allowance dated Jun. 20, 2017, in U.S. Appl. No. 15/154,975.
Notice of Allowance dated Mar. 1, 2018, in U.S. Appl. No. 15/464,314.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated Nov. 17, 2017, in U.S. Appl. No. 15/154,993.
Notice of Allowance dated Oct. 6, 2017, in U.S. Appl. No. 15/610,162.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
Final Office Action dated Aug. 10, 2018, in U.S. Appl. No. 15/796,230.
Final Office Action dated Aug. 2, 2018, in U.S. Appl. No. 15/154,996.
Final Office Action dated Aug. 28, 2018, in U.S. Appl. No. 15/813,119.
Final Office Action dated Jun. 18, 2018, in U.S. Appl. No. 15/155,005.
Final Office Action dated May 18, 2018, in U.S. Appl. No. 15/654,461.
Non-final Office Action dated Apr. 12, 2018, in U.S. Appl. No. 15/154,997.
Non-final Office Action dated Apr. 23, 2018, in U.S. Appl. No. 15/813,127.
Non-final Office Action dated Apr. 5, 2018, in U.S. Appl. No. 15/154,984.
Non-final Office Action dated Aug. 10, 2018, in U.S. Appl. No. 16/004,578.
Non-final Office Action dated Jun. 29, 2018, in U.S. Appl. No. 15/154,974.
Non-final Office Action dated Jun. 8, 2018, in U.S. Appl. 15/452,574.
Notice of Allowance dated Apr. 30, 2018, in U.S. Appl. No. 15/155,012.
Notice of Allowance dated Jul. 11, 2018, in U.S. Appl. No. 15/154,995.
Notice of Allowance dated May 4, 2018, in U.S. Appl. No. 15/897,547.
Notice of Allowance dated Sep. 11, 2018, in U.S. Appl. No. 15/608,963.

\* cited by examiner

HISTORICAL DATA REPLAY UTILIZING A COMPUTER SYSTEM

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for replaying a time-period of historical data utilizing a computer system.

Historically, entities with large data production systems have maintained a test environment for running simulated real-time data or test data that is separate from a production environment for running production real-time data. Maintaining separate environments can prevent the contamination of current real-time data in the production system with historical data being used as real-time data in the test system. But maintaining two separate environments can increase system costs because hardware and software are replicated to build the simulation environment. There can also be additional staff costs for maintaining and synchronizing two separate environments. It is also unlikely that every user of the separate simulation system would want the same set of data or same configuration, requiring more staff time for setup and configuration. Also, because each user may desire a different simulation configuration, simulation resources would have to be reserved for each user. The core problem is that production and simulation systems typically require different code. A person is typically required to translate between the two systems. This process is error prone and leads to problems.

Embodiments were conceived in light of the above mentioned needs, problems and/or limitations, among other things.

Some implementation can include a computer system for executing query programs in a simulated mode comprising one or more processors, computer readable storage coupled to the one or more processors, the computer readable storage having stored thereon instructions that, when executed by the one or more processors, cause the one or more processors to perform operations. The operations can include establishing a digital connection between a query processor and a query client device. The operations can also include the query client device parsing a query program with one or more configuration instructions. The operations can further include receiving at the query processor, a query program with one or more configuration instructions from the query client device. The operations can include the query processor parsing the one or more configuration instructions. The operations can also include the query processor determining from the one or more configuration instructions from the query client device whether to initialize a simulation mode or a real-time mode. The operations can include when the query processor determines a simulation mode, initializing the computer system to operate in the simulated mode. The initializing can include extracting a simulation period from the one or more configuration instructions. The initializing can also include the query processor processing the query program with real-time code. The processing can also include requesting real-time data simulated from historical data.

The processing can include requesting non-action system generated historical data. The initializing can further include creating anti-look-ahead bias historical filters.

The processing can further include applying the anti-look-ahead bias historical data filters to the requested non-action system generated real-time data simulated from historical data.

The operations can include when a simulated real-time action system does not exist, constructing a simulated real-time action system. The operations can also include the query processor connecting to the simulated real-time action system. The operations can further include generating simulated real-time action system data.

The operations can include when a simulated real-time action system does not exist, constructing a simulated real-time action system. The operations can also include the query processor connecting to the simulated real-time action system. The operations can further include generating simulated real-time action system data.

The operations can include the query processor determining from the parsing of the one or more configuration instructions, a simulation clock cycle and a clock cycle speed. The operations can also include for each clock cycle for the simulation period, the query processor starting a simulated clock cycle, determining any data changes in the clock cycle, applying the data changes to an update propagation graph, and updating dynamic simulated real-time action system dynamic tables.

The operations can include wherein real-time data simulated from historical data includes sorting the data by sequence ID or by time stamp for only the current clock cycle prior to use.

Some implementations can include a method for initializing a computer system to execute query programs in a simulated mode comprising establishing a digital connection between a query processor and a query client device. The method can also include receiving at the query processor, a query program with one or more configuration instructions from the query client device. The method can further include the query processor parsing the one or more configuration instructions. The method can also include the query processor determining from the one or more configuration instructions from the query client device whether to initialize a simulation mode or a real-time mode. The method can include when the query processor determines a simulation mode, initializing the computer system to operate in the simulated mode. The initialization can include extracting the simulation period from the one or more configuration instructions. The initialization can also include the query processor processing the query program with real-time code. The processing can also include requesting real-time data simulated from historical data.

The processing can include requesting non-action system generated historical data. The initializing can further include creating anti-look-ahead bias historical filters.

The processing can also include applying the anti-look-ahead bias historical data filters to the requested non-action system generated real-time data simulated from historical data.

The method can further include when a simulated real-time action system does not exist, constructing a simulated real-time action system. The method can also include the query processor connecting to the simulated real-time action system. The method can include generating simulated real-time action system data.

The method can further include the query processor determining from the parsing of the one or more configuration instructions, a simulation clock cycle and a clock cycle speed. The method can also include for each clock cycle for the simulation period, the query processor starting a simulated clock cycle, determining any data changes in the clock cycle, applying the data changes to an update propagation graph, and updating dynamic simulated real-time action system dynamic tables.

The method can further include wherein real-time data simulated from historical data includes sorting the data by sequence ID or by time stamp for only the current clock cycle prior to use.

The method can also include replacing the simulated real-time action system with a second simulated real-time action system.

Some implementations can include a nontransitory computer readable medium having stored thereon software instructions that, when executed by one or more processors, cause the one or more processors to perform operations. The operations can include establishing a digital connection between a query processor and a query client device. The operations can also include the query client device parsing a query program with one or more configuration instructions. The operations can further include receiving at the query processor, a query program with one or more configuration instructions from the query client device. The operations can also include the query processor parsing the one or more configuration instructions. The operations can include the query processor determining from the one or more configuration instructions from the query client device whether to initialize a simulation mode or a real-time mode. The operations can also include when the query processor determines a simulation mode, initializing the computer system to operate in the simulated mode. The initializing can include extracting a simulation period from the one or more configuration instructions. The initializing can also include the query processor processing the query program with real-time code. The processing can also include requesting real-time data simulated from historical data.

The processing can include requesting non-action system generated historical data. The initializing can further include creating anti-look-ahead bias historical filters.

The processing can also include applying the anti-look-ahead bias historical data filters to the requested non-action system generated real-time data simulated from historical data.

The operations can include when a simulated real-time action system does not exist, constructing a simulated real-time action system. The operations can also include the query processor connecting to the simulated real-time action system. The operations can further include generating simulated real-time action system data.

The operations can include when a simulated real-time action system does not exist, constructing a simulated real-time action system. The operations can also include the query processor connecting to the simulated real-time action system. The operations can further include generating simulated real-time action system data.

The operations can include the query processor determining from the parsing of the one or more configuration instructions, a simulation clock cycle and a clock cycle speed. The operation can also include for each clock cycle for the simulation period, the query processor starting a simulated clock cycle, determining any data changes in the clock cycle, applying the data changes to an update propagation graph, and updating dynamic simulated real-time action system dynamic tables.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
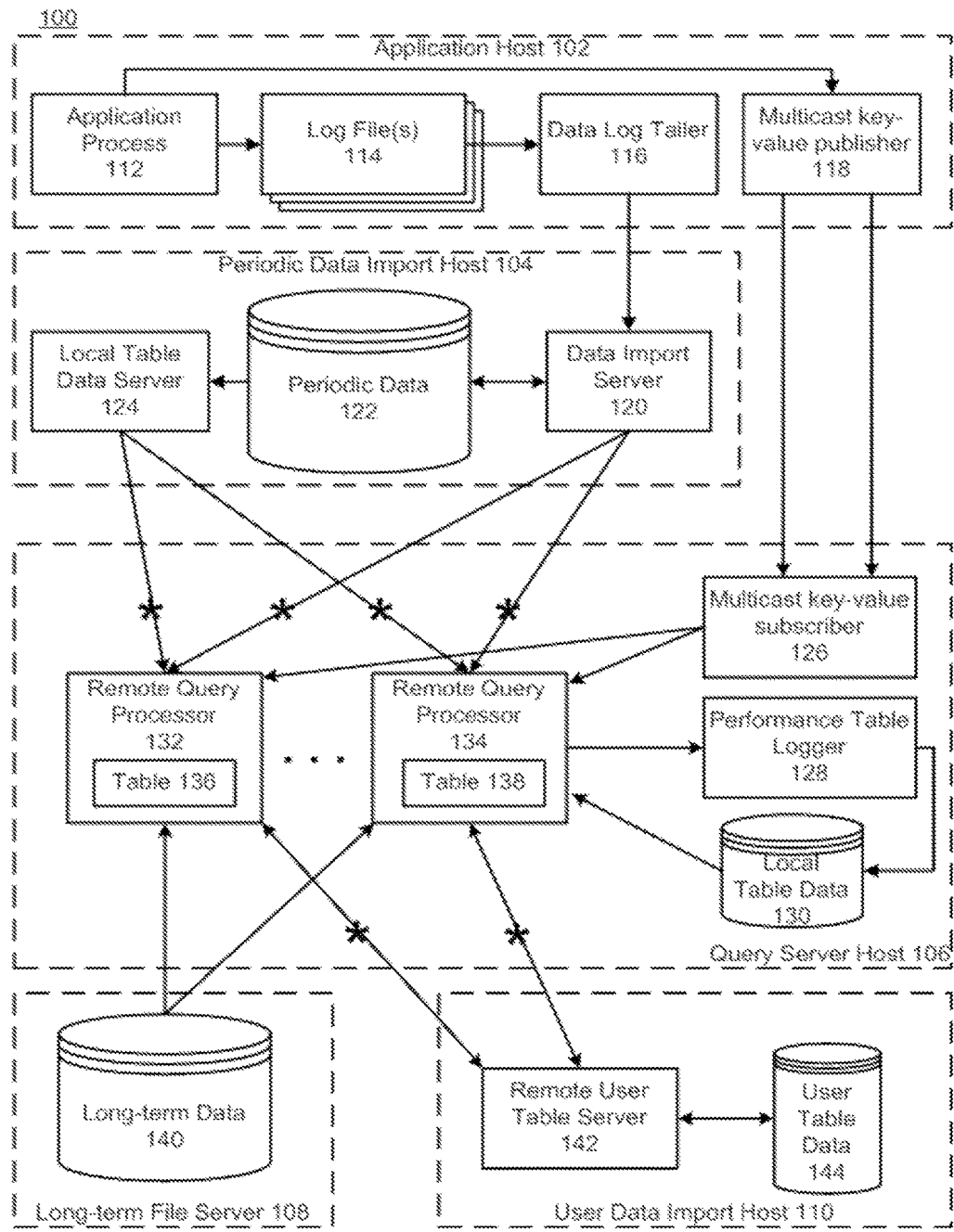
FIG. 1 is a diagram of an example computer data system showing an example data distribution configuration in accordance with some implementations.
Figure 2:
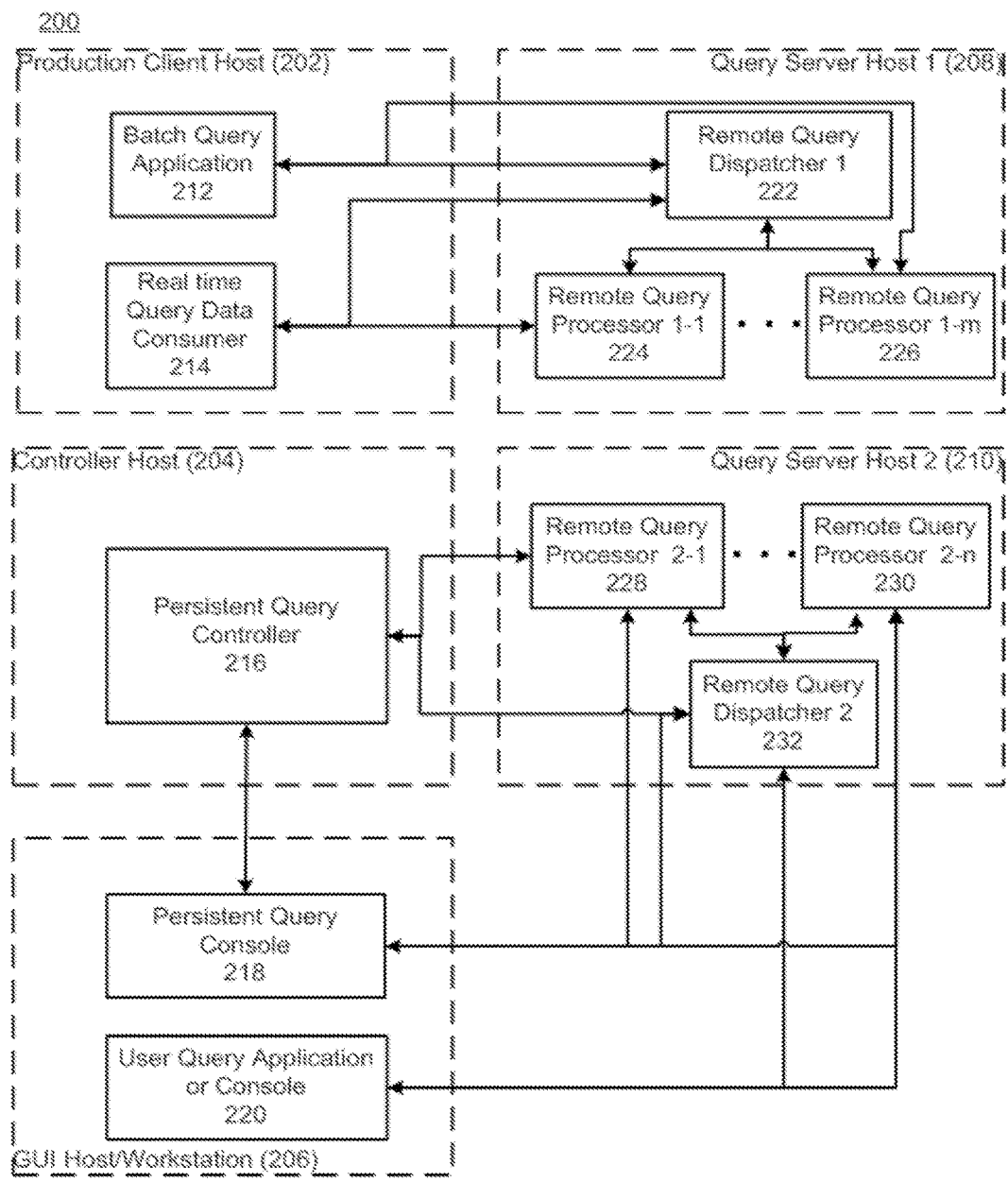
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market open, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
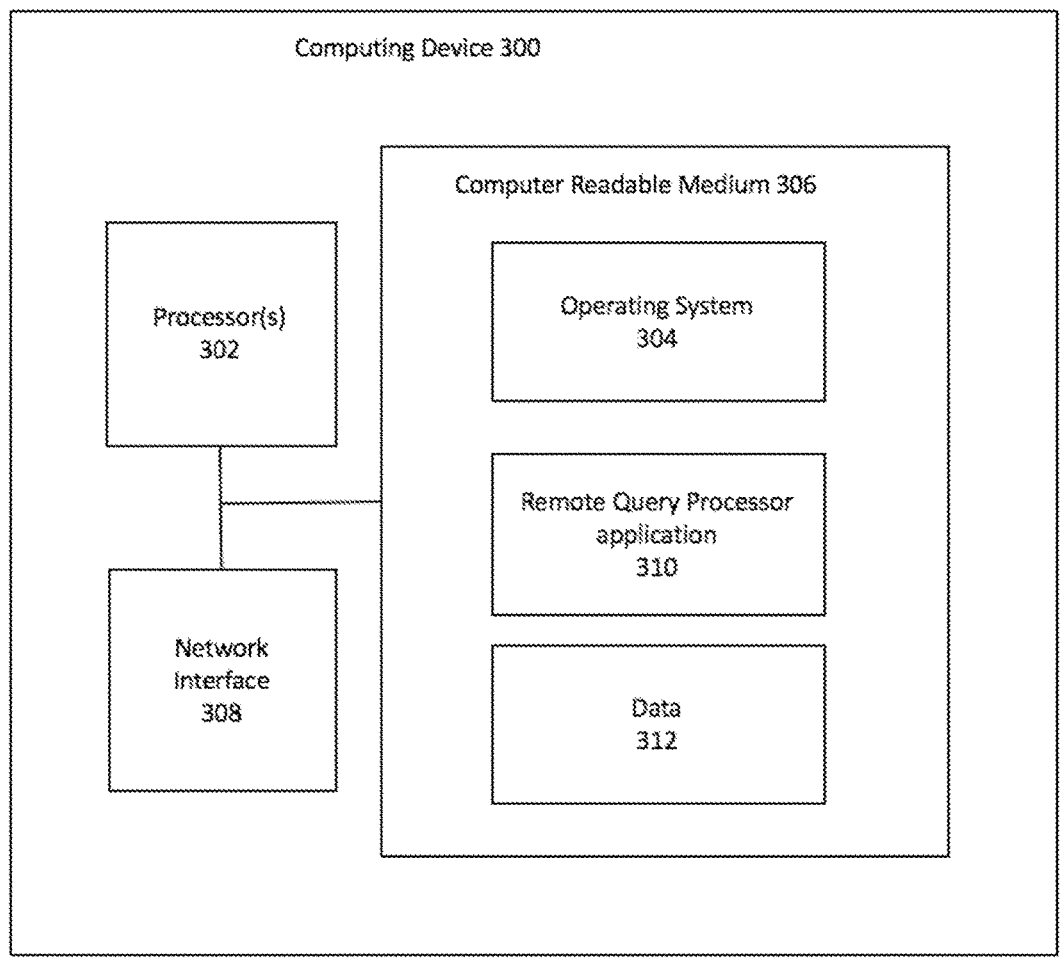
FIG. 3 is a diagram of an example computing device configured for data replay processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include remote query processor application 310 and a data section 312 (e.g., for storing ASTs, precompiled code, etc.).

In operation, the processor 302 may execute the application 310 stored in the memory 306. The application 310 can include software instructions that, when executed by the processor, cause the processor to perform operations for historical data replay operations in accordance with the present disclosure (e.g., performing one or more of 602-626, 702-716 described below).

The application program 310 can operate in conjunction with the data section 312 and the operating system 304.

Large data-dependent systems such as real-time stock trading systems can receive, parse, and analyze a continuous large stream of data that can be stored into large historical data stores for further analysis or replay. A user may desire to replay all, or a subset of a particular trading day's data at a later point to determine if better trades could have been made or if the user's queries being used to make trading decisions were optimal or whether a modification to the queries would have provided better decision making results and thus better trades. Setting up a separate simulation environment that replays historical trading data is difficult and error-prone. Moreover, an incorrectly-provisioned simulation environment may not accurately represent the state of the data at any given point in time. Beyond concerns relating to either the fidelity or ease-of-use of a simulation environment, when separate query code is employed in simulation and production, costly errors can be made when translating from one environment to another. The user would rather have the option to submit a simple command, well within a basic user's query writing skillset, and submit that command to the computer system, such as RunSimulation 2016 Mar. 3. A RunSimulation 2016 Mar. 3 command could alert the system that the user desires that the user's script be executed using the existing computer system but with data collected from 2016 Mar. 3 as simulated real-time input instead of current real-time data.

Figure 4:
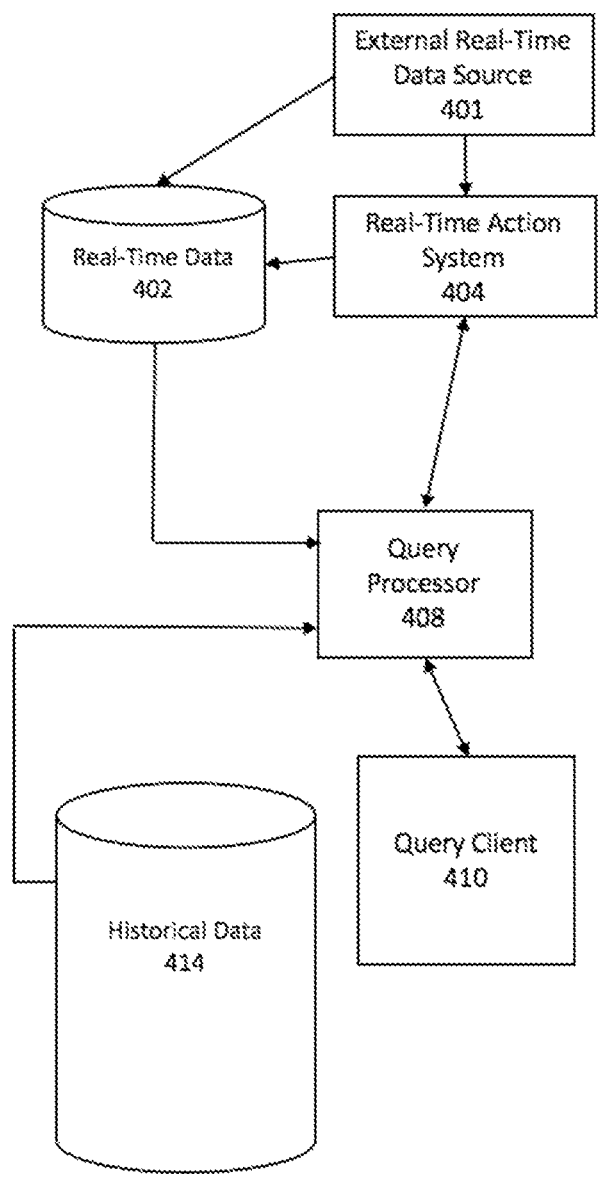
FIG. 4 is a diagram of an example system in real-time mode in accordance with some implementations.

FIG. 4 is a diagram of an example computer system in real-time mode 400 in accordance with some implementations. The query client 410 can be used to submit a query script to a computer system. The query client 410 can be on a remote computing device or local computing device. The query processor 408 can receive the submitted query script and start the processing of the query script. If the query script requires historical data 414, the query processor 408 can retrieve the appropriate historical data 414. The historical data 414 can be stored data that was previously collected as real-time data 402 or data that was never available in a real-time environment. If the query script requires real-time data 402, the query processor 408 can retrieve the appropriate real-time data 402. The real-time data 402 can be continuously updated with current real-time data streams from a real-time action system 404 and an external real-time data source 401. The query processor 408 can communicate with a real-time action system 404.

It will be appreciated that real-time data can be collected at different rates that can depend on the availability of data from the external real-time data source 401 and the real-time action system 404.

It will also be appreciated that the computer system can be a live production computer system or the computer system can be a separate system from the live production computer system that is running the same code. It will also be appreciated that the historical data 414 can be the same source for both types of systems.

Figure 5:
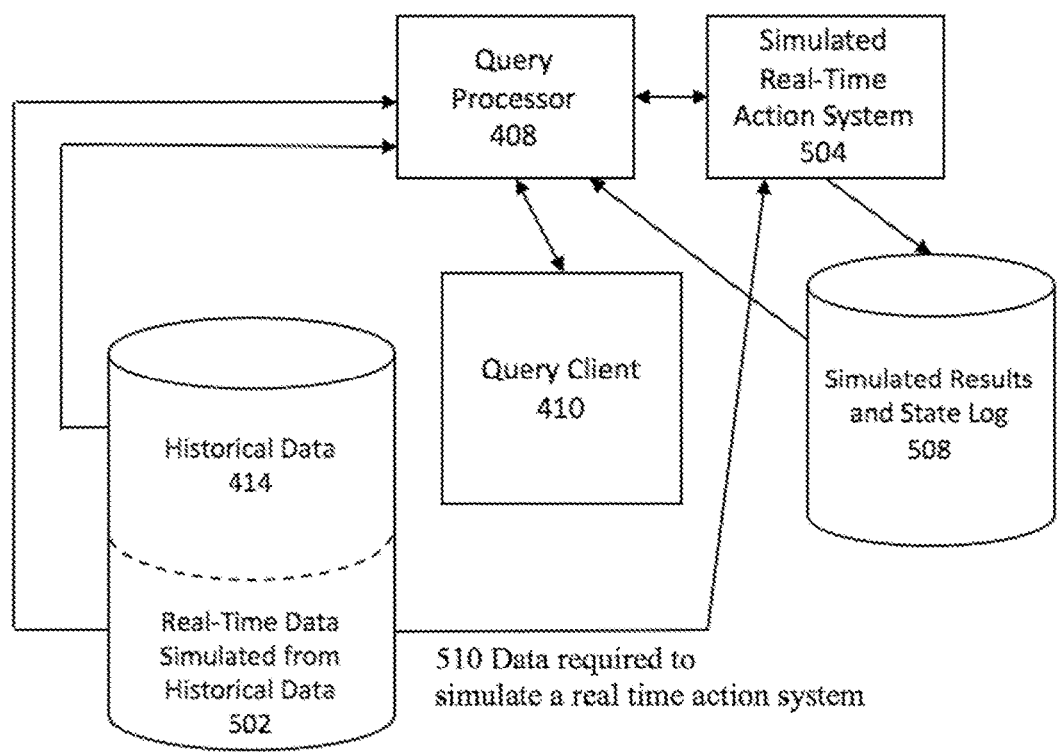
FIG. 5 is a diagram of an example system in simulation mode in accordance with some implementations.

FIG. 5 is a diagram of an example computer system in simulation mode 500 in accordance with some implementations. A query client 410 can be the same query client for the system in production mode in FIG. 4. A query processor 408 can be the same query processor for the system in production mode in FIG. 4. A historical data 414 can be the same historical data 414 store for the system in production mode in FIG. 4. In simulation mode 500, the real-time data 402 in FIG. 4 can be replaced by real-time data simulated from historical data 502. For example, if today's date is 2016 Mar. 15 and a user submitted a simulation request to replay data from 2016 Mar. 13, the system can set up a portion of the historical data 414 from 2016 Mar. 13 to be used as real-time data simulated from historical data 502 to be replayed into the system as if it were real-time data occurring on 2016 Mar. 13. The distinction between historical data 414 and real-time data simulated from historical data 502 can be in identifying the boundaries of the historical data to be used as real-time data. For example, the data identified as real-time data simulated from historical data 502 is only a designation of a section of historical data 414 to be used in a simulation as real-time data for a period of time. The designation, in itself, does not alter the underlying historical data 414 that is cordoned off as data to be used in a simulation. Any changes to the real-time data simulated from historical data 502 in preparation to use the data for the simulation would occur after the data is read from the data store. The underlying historical data 414 remains unchanged. A simulated real-time action system 504 can replace the real-time action system 404 in FIG. 4. Data required to simulate a real-time action system 510 can be retrieved by a query from the real-time data simulated from historical data 502. A simulated results and state log 508 can capture logged events from a simulation run.

It will be appreciated that the real-time data received from an external real-time data source 401 in FIG. 4 is not needed in simulation mode 500 because the real-time data 402 received from an external real-time data source 401 can be simulated with real-time data simulated from historical data 502. For example, external real-time data source 401 can be a provider that streams stock market quotes with date-timestamps as a service. The stock market quotes with associated date-timestamps can be saved into a historical data 414 store for later replay into a simulation mode. Alternatively, a third-party source of data can be purchased and inserted into the historical data 502 for replay as if it were available in real-time.

It will also be appreciated that a real-time action system 404 can be an external system that can communicate with a query processor 408 to carry out user requests. For example, a real-time action system 404 can be a stock trading entity that can receive buy or sell commands for a particular stock from the query processor 408 based on a user query script from a query client 410. The simulated real-time action system 504 can fill stock orders in a manner that is consistent with the observed behavior of the real-time action system, for example the user's simulated portfolio being modified in the same manner as the real-time action system.

It will further be appreciated that the query processor 408 can access a simulated results and state log 508 to provide a query with knowledge of how the query has impacted simulated reality. For example, changes in position data updates as a result of simulated trades.

Figure 5A:
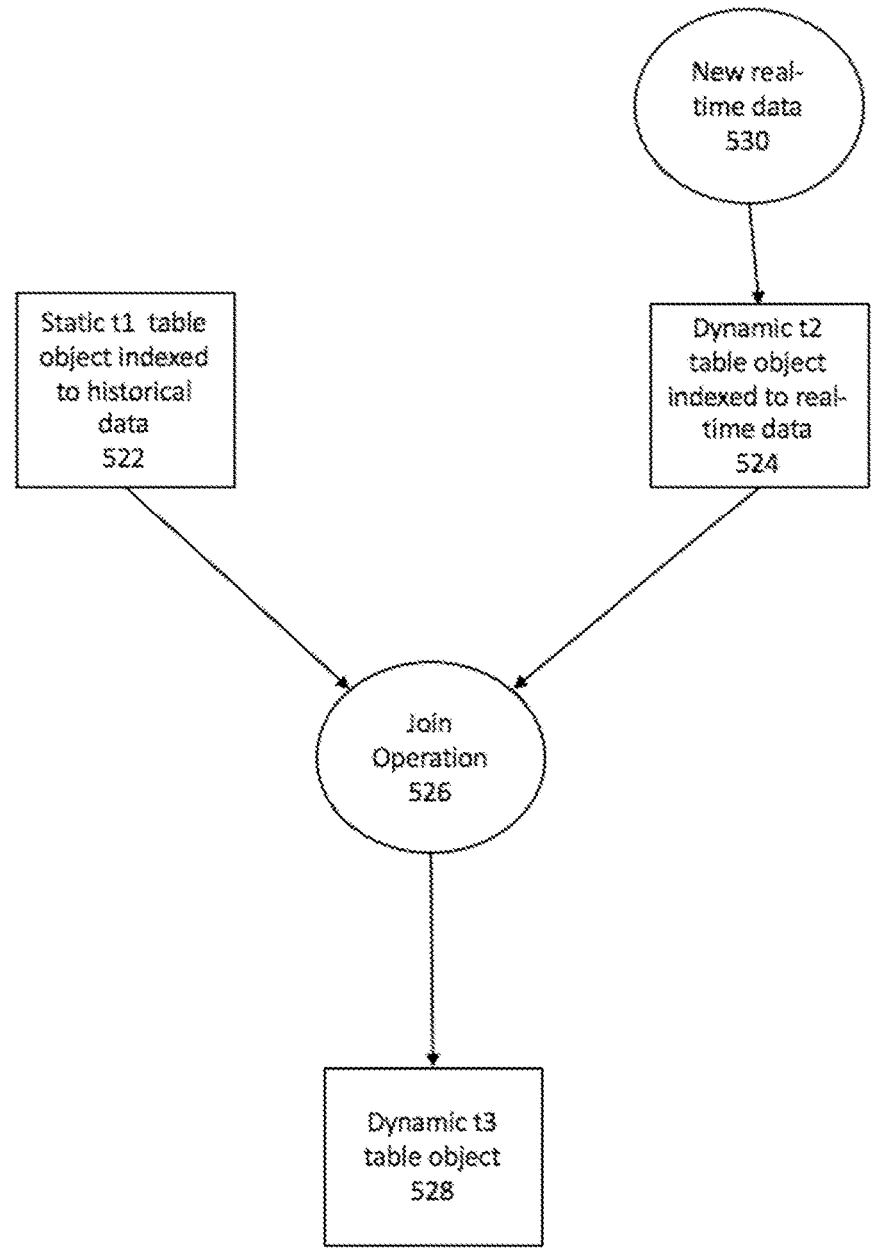
FIG. 5A is a diagram of an example update propagation graph in real-time mode.

FIG. 5A is a diagram of an example Directed Acyclic Graph (update query graph) in real-time mode 520. For example, in real-time mode 520, a static t1 table object indexed to historical data 522 can be joined using a join operation 526 with a dynamic t2 table object indexed to real-time data 524 to form a dynamic t3 table object 528. New real-time data 530 can be added to the dynamic t2 table object indexed to real-time data 524 and the new real-time data 530 can be propagated downward through the update propagation graph to update the child nodes, such as the join operation 526 and the dynamic t3 table object 528.

Figure 5B:
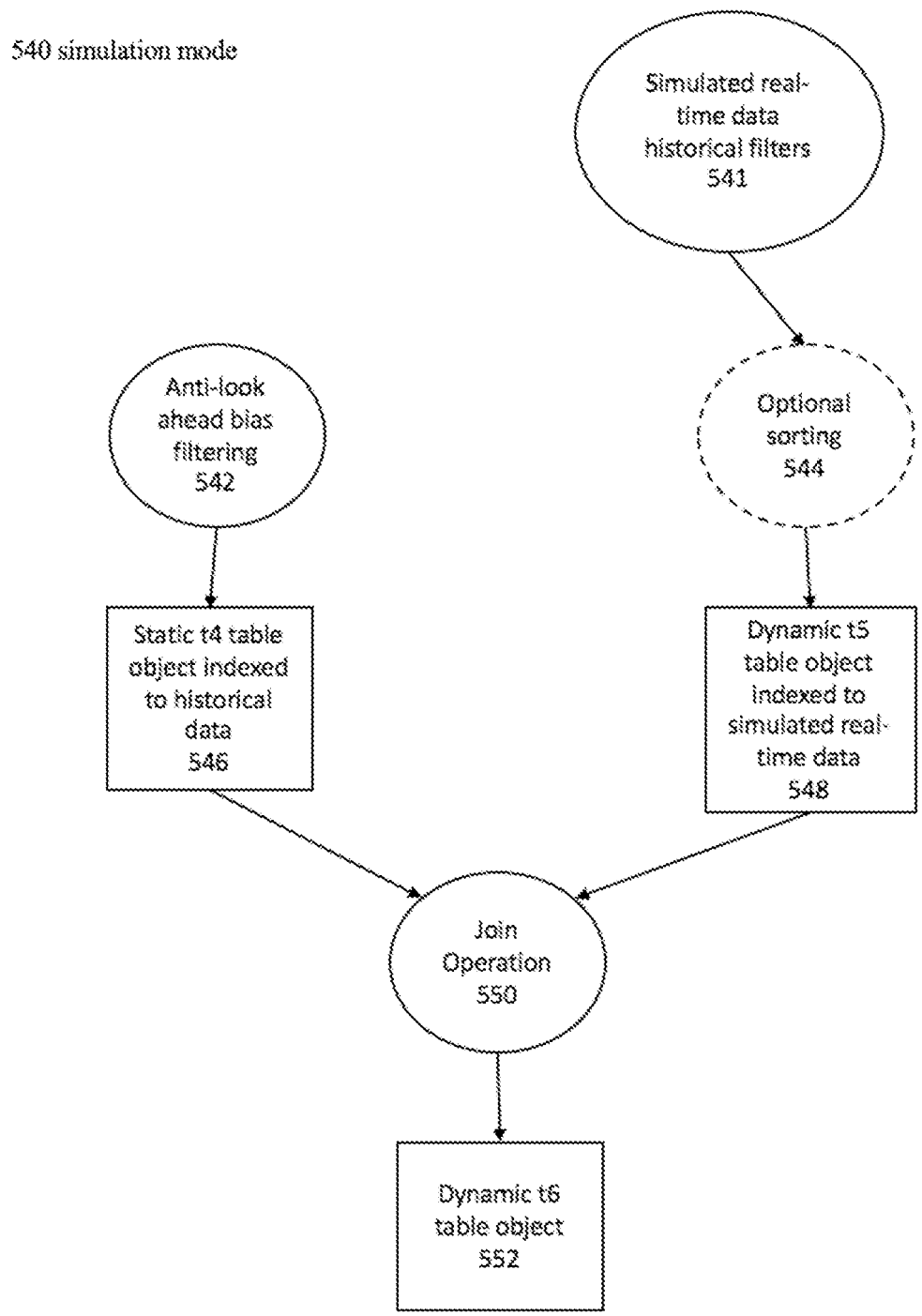
FIG. 5B is a diagram of an example update propagation graph in simulation mode.

FIG. 5B is a diagram of an example update propagation graph in simulation mode 540. For example, in simulation mode, a static t4 table object indexed to historical data 546 can be joined using a join operation 550 with a dynamic t5 table object indexed to simulated real-time data 548 to form a dynamic t6 table object 552. Historical data can be filtered by an anti-look ahead bias filtering 542 to prevent users from being able to look ahead at data that can occur at a future simulation time. New simulated real-time data filtered by simulated real-time data historical filters 541 can be added to the dynamic t5 table object indexed to simulated real-time data 548 and an optional sorting 544 is applied, and the new real-time data 541 can be propagated downward through the update propagation graph to update the child nodes, such as the join operation 550 and the dynamic t6 table object 552.

Figure 6:
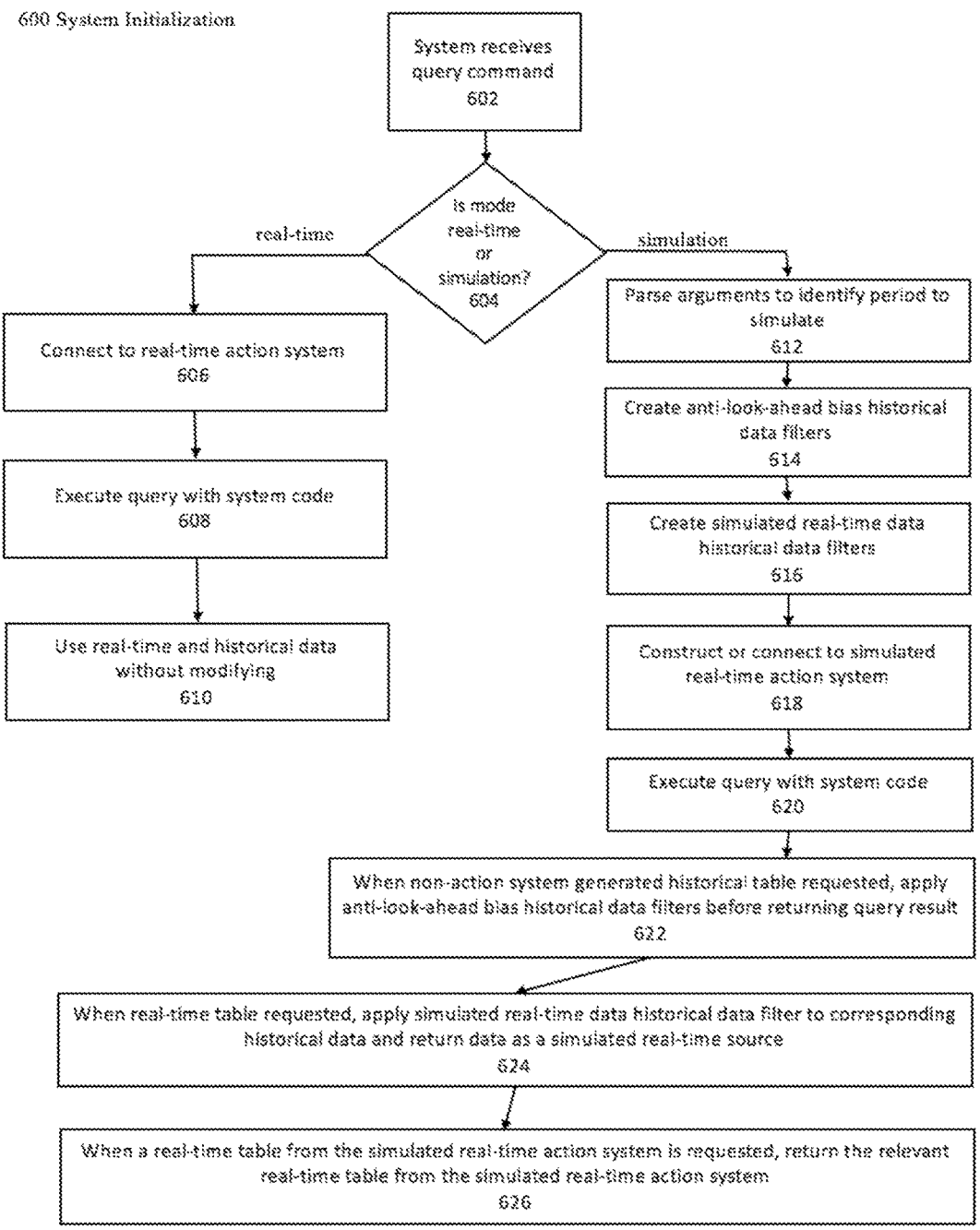
FIG. 6 is a flowchart of an example system initialization in accordance with some implementations.

FIG. 6 is a flowchart of an example computer system initialization 600 in accordance with some implementations. Processing begins at 602, when the computer system query processor 408 receives a query script from a query client 410. Processing continues to 604.

At 604, the computer system can determine whether the query script designates a real-time or simulation mode. For example, a RunSimulation 2010 Apr. 15 2016 Mar. 3 myscript.extension can be interpreted as designating a simulation mode and a Run myscript.extension can be interpreted as designating a real-time mode. If a real-time mode is designated, processing continues to 606. If a simulation mode is designated, processing continues to 612. The 606 path is discussed first before returning to discuss the 612 path.

At 606, the computer system can connect to a real-time action system 606. Such a connection is shown in FIG. 4 between a real-time action system 404 and a query processor 408. Processing continues to 608.

At 608, a query processor 408 executes the received query script using the real-time system code. For example, if the query script contains t3=t1.where("SYM='AAPL'"), the query processor 408 can build an update graph containing a t1 dynamic table object node, a where operation child node, and a resultant t3 dynamic table object child node. Processing continues to 610.

At 610, a query processor 408 retrieves the historical data 414 and real-time data 402 without modifying the data to complete the query script. For example, if the query script contains t3=t1.join(t2, "SYM"), and t1 is a table object with data based on historical data 414 and a t2 object is a dynamic table being updated every second with real-time data 402, the query processor 408 can retrieve data from real-time data 402 and historical data 414 to complete the join to create the dynamic t3 table object. In this example, the dynamic t3 table object will continue to be updated as new data is received from the real-time data 402 by listening for changes to the parent table t2. The discussion now returns to the simulation path from 604 to the processing at 612.

At 612, the query processor 408 parses the query script command submission in order to identify the time period to simulate. For example, a "RunSimulation 2010 Apr. 15 2016 Mar. 3 myscript.extension" can be parsed to obtain a period starting with 2010 Apr. 15 and ending with 2016 Mar. 3.

It will be appreciated that a client device can also parse a query script command prior to submission. Processing continues to 614.

At 614, the query processor 408 creates anti-look-ahead bias historical data filters. For example, if the simulation period is from 2010 Apr. 15 to 2016 Mar. 3, the filters can be created to keep the processing of data starting with 2010 Apr. 15 from looking ahead to data from a later time until that later time clock cycle has occurred.

It will be appreciated that an anti-look ahead bias filter can prevent access to historical data that has not yet occurred in the simulation and can operate on a gross time-period, for example, one day. Processing continues to 616.

At 616, the query processor 408 creates simulated real-time data historical filters for the real-time data simulated from historical data 502. The historical filters can be applied to each day of simulated time. For example, if the simulation period is from 2010 Apr. 15 to 2016 Mar. 3, a real-time data historical filter can be configured for each of the days from 2010 Apr. 15 to 2016 Mar. 3 to confine the retrieval of data from the historical data 414 to data date-timestamps for a particular time of the simulation between 2010 Apr. 14 and 2016 Mar. 4 in order to keep the user from accessing data from a point in time beyond the current simulated time, which would be future data in the simulation.

It will be appreciated that simulated real-time data historical filters can be more fine-grained than an anti-look ahead bias filter. For example, a simulated real-time data historical filter can be for a time-period within a particular day time-period for preventing a user from accessing data from a later time in a same simulation day (e.g., preventing access to a 4 o'clock exchange closing price on a stock when the current simulation time is at 9:30 a.m.). The simulated real-time historical filter can permit the system to trickle in data as the simulation clock advances. Processing continues to 618.

At 618, a query processor 408 constructs a simulated real-time action system 504 if one does not already exist. If a simulated real-time action system 504 already exists, the query processor 408 can connect to the simulated real-time action system 504.

It will be appreciated that a simulated real-time action system can be replaced by another simulated real-time action system that may have different characteristics. Processing continues to 620.

At 620, a query processor 408 executes the received query script using the production system code. For example, if the query script contains t3=t1.where("SYM='AAPL'"), the query processor 408 can build an update graph containing a t1 dynamic table object node, a where operation node, and a resultant t3 dynamic table object node. The update graph is now set up to permit each table object to update as simulated new data is processed through the running of the simulation.

It will be appreciated that the query processor 408 is executing the same code in the simulation path from 604 as the query processor 408 uses in the execution of the query script in real-time mode in 608.

It will be appreciated that a difference is not found in the source of code being executed but instead in the source for real-time data during the simulation, and in the historical data in the sense that an anti-look-ahead filter can be applied. Processing continues to 622.

At 622, if a non-action system generated historical table is requested by a query processor 408 to execute the query script, the anti-look-ahead bias historical filters are applied before returning the query results. For example, if t1 is a table object populated with data from historical data 414 as part of the simulation, and the simulated time period is from 2010 Apr. 15 to 2016 Mar. 3 and the simulation clock is at 2010 Apr. 15, the anti-look-ahead bias historical filters are applied to keep any of the historical data 414 with a date-timestamp after 2010 Apr. 14 from being accessed as historical data because in the simulation the data after 2010 Apr. 14 does not yet exist. Processing continues to 624.

At 624, if a real-time table is requested by a query processor 408 to execute a query script, the simulated real-time data historical filter is applied to the historical data 414. The filtered historical data can then be converted into real-time data simulated from historical data 502 to be used in the simulation as real-time data. The retrieved data can be optionally sorted, for example, by sequence ID or time stamp in order to remedy any situations where the data was not stored in the same order it was generated in real-time. For example, if t2 is a dynamic table object populated with simulated real-time data as part of the simulation, the query processor 408 can update the t2 table object as the simulation ticks through the clock cycles with the corresponding slice of simulated real-time data from the historical data 414.

It will be appreciated that the optional sort can be performed on only the data that is necessary to perform the next clock cycle prior to the start of the clock cycle. Processing continues to 626.

At 626, if a real-time table from the simulated real-time action system is requested by a query processor 408 to execute a query script, the relevant real-time table is retrieved from a location specified by the simulated real-time action system. For example, the location may be a handle to an in-memory table, a handle to an on disk table, etc. The simulated real-time action system tables typically contain state information for the simulated real-time action system such as current position sizes, current orders in the market, and the like. The tables are dynamic and can depend on the history of a particular real-time action system instance.

It will be appreciated that a role of the simulated real-time action system 504 can be to provide action system results to a user and accept user requests from the query script through interactions with a query processor 408. For example, if the real-time action system 404 is a stock trading system capable of accepting and acting on buy and sell orders, a user, who has an account with the stock trading system, can instruct the stock trading system through the query processor 408 to purchase a thousand shares of AAPL stock at limit price of $100 a share. If the conditions are met and the stock trading system completes the requested trade, the stock trading system adds the purchased stock shares to the user's portfolio that is maintained by the stock trading system and informs the user through the query processor 408 that the transaction has completed and reports the total number of shares (position) of AAPL that the user has in the portfolio. The position data can also be stored in the historical data 414 after being received as real-time data 402. During the simulation, the positions of the user can be rolled back to the positions at the start of the simulation time and then increased or decreased by actions taken by the user's query scripts during the simulation while at the same time stripping out the orders that were made and completed during the actual real-time period. The positions can also be set to zero or another arbitrary number to start the simulation.

Figure 7:
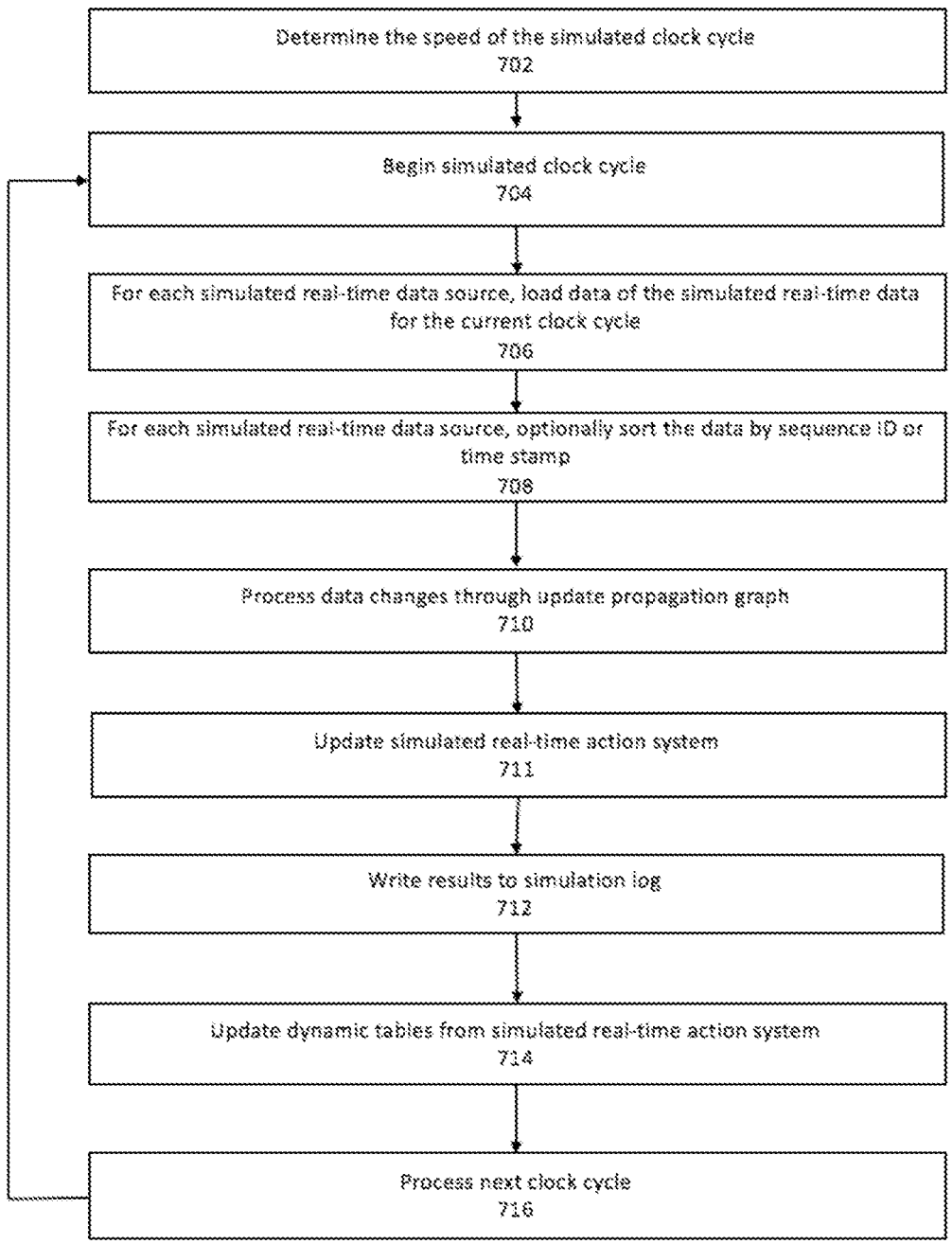
FIG. 7 is a flowchart of an example data replay simulation in accordance with some implementations.

FIG. 7 is a flowchart of an example data replay simulation 700 in the computer system in accordance with some implementations. Processing begins at 702.

At 702, the speed of the simulated clock cycle is determined by the query processor 408. For example, the user can submit a parameter with the RunSimulation program or GUI that specifies the clock cycle timing in relation to real time. The user can choose to run the simulation in slow motion or faster than one second of simulation per one second of measured time. The user can run the simulation as fast as the system can process the data cycles. Processing continues to 704.

At 704, the query processor 408 begins the simulated clock cycle. Processing continues to 706.

At 706, data of real-time data simulated from historical data 502 corresponding to the time parameters of the current simulated clock cycle is loaded into each simulated real-time data source. For example, if dynamic table objects t1, t2, and t3 are created from real-time data simulated from historical data 502, then a update propagation graph node representation is created for each of the table objects in a query processor memory. Then these table objects can be used to determine which data of real-time data simulated from historical data 502 are needed for the current simulated clock cycle.

It will be appreciated that each of the dynamic (real-time) table objects in existence at the time of the simulated time period can contain an index in the update propagation graph that can provide a mapping to the real-time data simulated from historical data 502 stores. Processing continues to 708.

At 708, each of the data loaded in 706 can be optionally sorted by a sequence ID or time stamp associated with each row of data.

It will be appreciated that sorting may not be needed if data was written to a historical data 414 store in the same order as it was created. The sorting can be applied for instances where data can be written to the historical data 414 out of order. Sorting may also not be required if a user script does not require the results to be sorted. Processing continues to 710.

At 710, the possibly ordered data for the clock cycle are processed through the update propagation graph as data changes. For example, if dynamic table objects t1, t2, and t3 are dynamic table objects represented in a update propagation graph with table object t2 being a child of table object t1 and table object t3 being a child of table object t2, the processing of the data through the update propagation graph starts with the parent table object node, t1. To further the example, table object t1 is a dynamic table object that can contain all the rows before the current simulation time from a real-time data source stored on a fileserver; table object t2 is a dynamic table object that can contain all of the rows from table object t1 that contain the AAPL stock symbol; and table object t3 is a dynamic table object that can contain all of the rows from t2 that have a stock price greater than $100. At the start of the clock cycle, all of the new rows from the data that were added to the stored data source can be added to the t1 table object because the t1 table object is a dynamic table that can be updated when its data source is updated. Because table object t2, a child table object of table object t1, can listen for updates to table object t1, when updates occur to table object t1, table object t2 can be updated. And because table object t3, a child object of table object t2, can listen for updates to table object t2, when updates occur to table object t2, table object t3 can be updated. Processing continues to 711.

At 711, update simulated real-time action system. Processing continues to 712.

At 712, results from simulated actions taken by a simulated real-time action system 504 in response to user's query scripts submitted to a query processor 408 and passed onto the simulated real-action system 504 can be written to simulated results and state logs 508. For example, if the query processor 408 determines the conditions from the query script are met for following a strategy for purchasing stock shares, a request with or without limitation instructions can be sent by the query processor 408 to a simulated real-time action system 504 to purchase the stock shares. The simulated real-time action system 504 can then look at the real-time simulated conditions at the simulation time of the request and determine if the request can be filled or not filled. The determination of the simulated real-time action system 504 can then be written to a simulated results and state logs 508 for further analysis as to why the trade was filled or why the trade was not filled. The results and state logs 508 can also be analyzed for the profitability of the decisions, and also provide feedback to the simulation query as it continues. Processing continues to 714.

At 714, dynamic position tables from a simulated real-time action system 504 can be updated with the outcome of a transaction. For example, if the simulated real-time action system is successful in purchasing a thousand shares of stock for the user, the user's portfolio is updated with the new position data.

It will be appreciated that simulated real-time action system tables derived from historical tables can be transformed according to instructions or specifications from the real time action system. Processing continues to 716.

At 716, if the clock cycle is still within the simulation time-period, the process proceeds to the next clock cycle and returns to step 704 to repeat steps 704 through 716. The loop can continue until the end of the simulation time-period is reached.

It will be appreciated that multiple period-centric loops can be implemented for a simulation time-period such as multiple day-centric loops that can extend over several days. For example, a 15-day simulation period can be broken down into 15 separate one-day simulations. It will also be appreciated breaking a simulation period into multiple separate simulations can affect a maintenance of continual state and feedback.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for simulated replay of data using a computer system.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer system for using a production environment to execute query programs in a simulated mode, the system comprising:
   one or more processors;
   computer readable storage coupled to the one or more processors, the computer readable storage having stored thereon instructions that, when executed by the one or more processors, cause the one or more processors to perform operations including:
   establishing a digital connection between a query processor and a query client device;
   receiving real-time data and storing historical data in the production environment;
   receiving at the query processor, a first query program with one or more first configuration instructions from the query client device;
   the query processor determining from the one or more first configuration instructions from the query client device that a real-time mode is to be used when executing the first query program;
   the query processor executing, in the real-time mode, the first query program in the production environment using production system code;
   receiving at the query processor, a second query program with one or more second configuration instructions from the query client device;
   the query processor parsing the one or more second configuration instructions;
   the query processor determining from the one or more second configuration instructions from the query client device that a simulation mode is to be used when executing the second query program;
   the query processor extracting a simulation period from the one or more second configuration instructions;
   the query processor determining from the one or more second configuration instructions a simulation clock cycle and a clock cycle speed; and
   while the system receives new real-time data and stores new historical data in the production environment, the query processor switching modes and executing, in the simulation mode, the second query program in the production environment using the same production system code used to execute the first query program in the real-time mode, the executing the second query program comprising:
   preventing the second query program from accessing the new real-time data;
   generating an update propagation graph (UPG) based on the second query program, the UPG having a plurality of nodes each corresponding to one of a plurality of data objects referenced by the second query program, the UPG having a structure representing the dependencies between the plurality of data objects in the second query program;
   requesting real-time data simulated from the historical data stored in the production environment; and
   for each clock cycle for the simulation period:
   starting a simulated clock cycle;
   determining data changes in the clock cycle;
   applying the data changes according to an order determined by the UPG; and
   updating dynamic simulated real-time action system dynamic tables.

2. The system of claim 1, the operations further comprising:
   requesting, by the one or more processors, non-action system generated historical data; and
   creating, by the one or more processors, anti-look-ahead bias historical filters.

3. The system of claim 2, the processing further comprising:
   applying, by the query processor, the anti-look-ahead bias historical data filters to the requested non-action system generated real-time data simulated from historical data.

4. The system of claim 1, the operations further comprising:
   when a simulated real-time action system does not exist, constructing, by the one or more processors, a simulated real-time action system;
   the query processor connecting to the simulated real-time action system; and
   generating, by the one or more processor, simulated real-time action system data.

5. The system of claim 1, wherein the requesting real-time data simulated from historical data includes the query processor sorting the data prior to use by sequence ID or by time stamp for only the current clock cycle.

6. The system of claim 1, wherein the first query program is different than the second query program.

7. The system of claim 1, wherein the one or more first configuration instructions are different than the one or more second configuration instructions.

8. The system of claim 1,
   wherein the real-time data are simulated from historical data by reading a copy of underlying historical data and applying, after the reading, one or more changes to the read copy of underlying historical data; and
   wherein the underlying historical data are unchanged by the reading and the applying.

9. The system of claim 1, wherein the historical data includes data that were never available in a real-time environment.

10. A method for using a computer system in a production environment to execute query programs in a simulated mode, the method comprising:
   establishing a digital connection between a query processor and a query client device;
   the computer system receiving real-time data and storing historical data in the production environment;
   receiving at the query processor, a first query program with one or more first configuration instructions from the query client device;
   the query processor determining from the one or more first configuration instructions from the query client device that a real-time mode is to be used when executing the first query program;

the query processor executing, in the real-time mode, the first query program in the production environment using production system code;

receiving at the query processor, a second query program with one or more second configuration instructions from the query client device;

the query processor parsing the one or more second configuration instructions;

the query processor determining from the one or more second configuration instructions from the query client device that a simulation mode is to be used when executing the second query program;

the query processor extracting a simulation period from the one or more second configuration instructions; and while the system receives new real-time data and stores new historical data in the production environment, the query processor switching modes and executing, in the simulation mode, the second query program in the production environment using the same production system code used to execute the first query program in the real-time mode, the executing the second query program comprising:

preventing the second query program from accessing the new real-time data; and requesting real-time data simulated from the historical data stored in the production environment.

11. The method of claim 10, further comprising:
requesting non-action system generated historical data; and
creating anti-look-ahead bias historical filters.

12. The method of claim 11, further comprising:
applying the anti-look-ahead bias historical data filters to the requested non-action system generated real-time data simulated from historical data.

13. The method of claim 10, further comprising:
when a simulated real-time action system does not exist, constructing a simulated real-time action system;
the query processor connecting to the simulated real-time action system; and
generating simulated real-time action system data.

14. The method of claim 13, further comprising replacing the simulated real-time action system with a second simulated real-time action system.

15. The method of claim 10, further comprising:
the query processor determining from the parsing of the one or more second configuration instructions, a simulation clock cycle and a clock cycle speed; and
for each clock cycle for the simulation period, the query processor:
starting a simulated clock cycle;
determining any data changes in the clock cycle;
applying the data changes to an update propagation graph; and
updating dynamic simulated real-time action system dynamic tables.

16. The method of claim 10, wherein real-time data simulated from historical data includes sorting the data by sequence ID or by time stamp for only the current clock cycle prior to use.

17. The method of claim 10,
wherein the real-time data are simulated from historical data by reading a copy of underlying historical data and applying, after the reading, one or more changes to the read copy of underlying historical data; and wherein the underlying historical data are unchanged by the reading and the applying.

18. The method of claim 10, wherein the historical data includes data that were never available in a real-time environment.

19. The method of claim 10, further comprising:
generating an update propagation graph (UPG) based on the second query program, the UPG having a plurality of nodes each corresponding to one of a plurality of data objects referenced by the second query program, the UPG having a structure representing the dependencies between the plurality of data objects in the second query program;
the query processor determining from the parsing of the one or more second configuration instructions a simulation clock cycle and a clock cycle speed; and
for each clock cycle for the simulation period:
starting a simulated clock cycle;
determining data changes in the clock cycle;
applying the data changes according to an order determined by the UPG; and
updating dynamic simulated real-time action system dynamic tables.

20. The method of claim 10, wherein the first query program is different than the second query program.

21. A nontransitory computer readable medium having stored thereon software instructions that, when executed by one or more processors of a computer system, cause the one or more processors to perform operations including:
establishing a digital connection between a query processor and a query client device;
the computer system receiving real-time data and storing historical data in a production environment;
receiving at the query processor, a first query program with one or more first configuration instructions from the query client device;
the query processor determining from the one or more first configuration instructions from the query client device that a real-time mode is to be used when executing the first query program;
the query processor executing, in the real-time mode, the first query program in the production environment using production system code;
receiving at the query processor, a second query program with one or more second configuration instructions from the query client device;
the query processor parsing the one or more second configuration instructions;
the query processor determining from the one or more second configuration instructions from the query client device that a simulation mode is to be used when executing the second query program;
the query processor extracting a simulation period from the one or more second configuration instructions; and
while the computer system receives new real-time data and stores new historical data in the production environment, the query processor switching modes and executing, in the simulation mode, the second query program in the production environment using the same production system code used to execute the first query program in the real-time mode, the executing the second query program comprising:
preventing the second query program from accessing the new real-time data; and
requesting real-time data simulated from the historical data stored in the production environment.

22. The nontransitory computer readable medium of claim 21, the operations further comprising:
- requesting non-action system generated historical data; and
- creating anti-look-ahead bias historical filters.

23. The nontransitory computer readable medium of claim 22, the operations further comprising:
- applying the anti-look-ahead bias historical data filters to the requested non-action system generated real-time data simulated from historical data.

24. The nontransitory computer readable medium of claim 21, the operations further comprising:
- when a simulated real-time action system does not exist, constructing, by the one or more processors, a simulated real-time action system;
- the query processor connecting to the simulated real-time action system; and
- generating simulated real-time action system data.

25. The nontransitory computer readable medium of claim 21, the operations further comprising:
- the query processor determining from the parsing of the one or more second configuration instructions, a simulation clock cycle and a clock cycle speed;
- for each clock cycle for the simulation period, the query processor:
  - starting a simulated clock cycle;
  - determining any data changes in the clock cycle;
  - applying the data changes to an update propagation graph; and
  - updating dynamic simulated real-time action system dynamic tables.

26. The nontransitory computer readable medium of claim 21,
wherein the real-time data are simulated from historical data by reading a copy of underlying historical data and applying, after the reading, one or more changes to the read copy of underlying historical data; and
wherein the underlying historical data are unchanged by the reading and the applying.

27. The nontransitory computer readable medium of claim 21, wherein the historical data includes data that were never available in a real-time environment.

28. The nontransitory computer readable medium of claim 21, the operations further including:
- generating an update propagation graph (UPG) based on the second query program, the UPG having a plurality of nodes each corresponding to one of a plurality of data objects referenced by the second query program, the UPG having a structure representing the dependencies between the plurality of data objects in the second query program;
- the query processor determining from the parsing of the one or more second configuration instructions a simulation clock cycle and a clock cycle speed; and
- for each clock cycle for the simulation period:
  - starting a simulated clock cycle;
  - determining data changes in the clock cycle;
  - applying the data changes according to an order determined by the UPG; and
  - updating dynamic simulated real-time action system dynamic tables.

29. The nontransitory computer readable medium of claim 21, wherein the first query program is different than the second query program.

* * * * *